April 9, 1968 G. R. MONTGOMERY 3,377,029
SLOTTED, FRICTIONALLY HELD SLEEVE SURROUNDING
A NOZZLE ORGANIZATION
Filed March 18, 1966 2 Sheets-Sheet 1

INVENTOR.
GEORGE R. MONTGOMERY
BY Kimmel, Crowell & Weaver
ATTORNEYS.

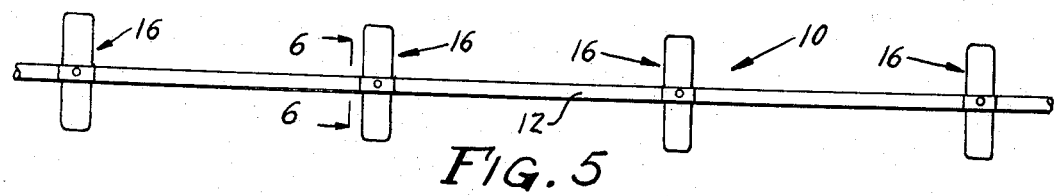
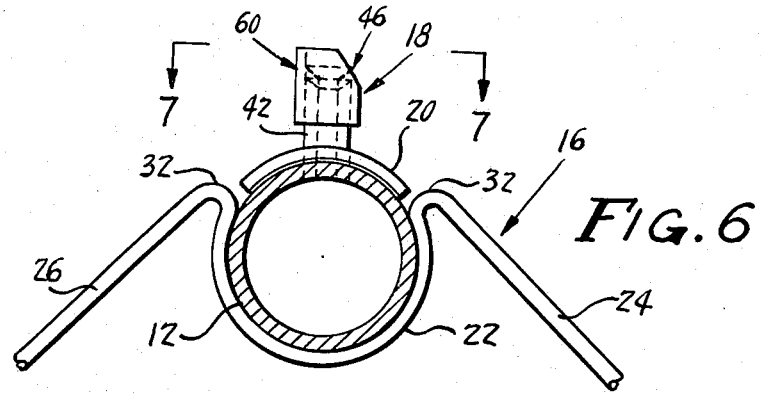
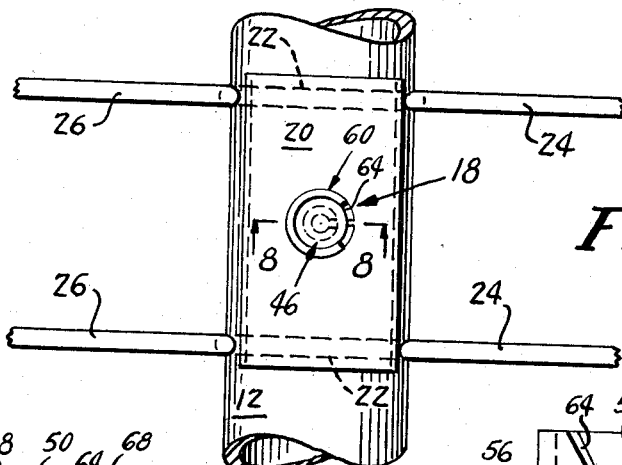
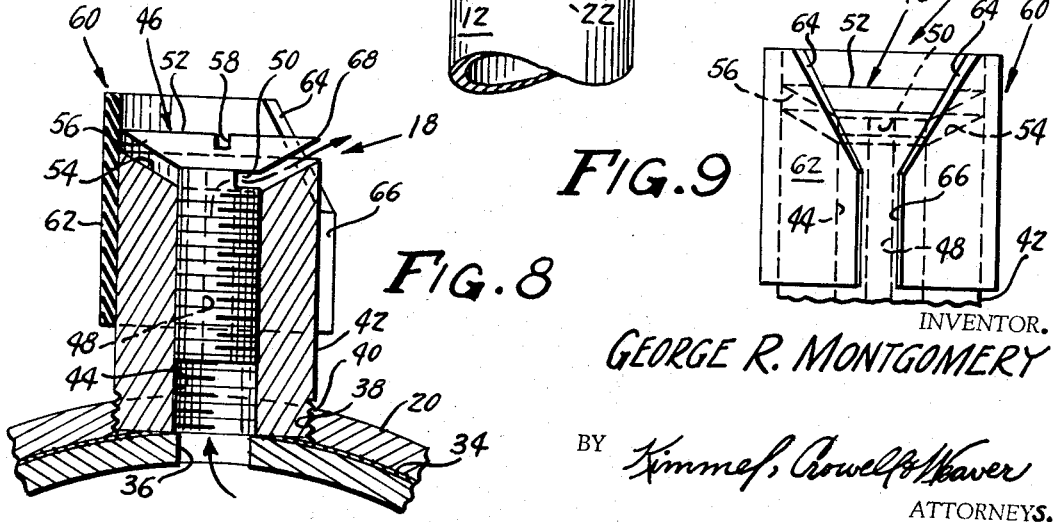

United States Patent Office 3,377,029
Patented Apr. 9, 1968

3,377,029
SLOTTED, FRICTIONALLY HELD SLEEVE SURROUNDING A NOZZLE ORGANIZATION
George R. Montgomery, 1152 Okeechobee Road,
West Palm Beach, Fla. 33401
Filed Mar. 18, 1966, Ser. No. 535,538
10 Claims. (Cl. 239—458)

ABSTRACT OF THE DISCLOSURE

A water irrigation system including nozzle equipped piping and ground engaging support means for positioning the piping in a vertically spaced and elevated position above the ground, and wherein the support means includes a resilient snap-on stand having a portion thereof adapted to contract about the pipe under the influence of its weight to tightly grip the same while at the same time permitting the gripping portion to be expanded to permit the easy separation of the piping and stand; and wherein the pipe is provided with apertured nozzle means projecting laterally therefrom and including valve means therefor which cooperate with a slotted sleeve slidably mounted for adjustment relative to the nozzle means and cooperating with the valve means to provide a further control over the water dispersion from the nozzle.

---

This invention relates to sprinklers for discharging liquids, and more particularly to a water irrigation system wherein a plurality of pipes are disposed adjacent the ground level in the area to be watered.

It is an object of the instant invention to provide a snap-on type stand for supporting a water carrying pipe above the ground.

Another object of the instant invention is to provide an irrigation pipe and stand in which the pipe carries a concentric strengthening plate with the stand being placed adjacent thereto.

Still another object of the instant invention is to provide a stand for supporting an irrigation pipe above the ground to avoid killing the grass on which the pipe would normally rest.

A further object of the instant invention is to provide a stand for supporting an irrigation pipe which is inexpensive to construct, easy to assemble and disassemble, and which is durable and long lasting in use.

A still further object of the instant invention is to provide a new and novel nozzle for spraying water adjacent an irrigation pipe.

Still another object of the instant invention is to provide a combined nozzle and movable sleeve for controlling the lateral extent of water flow.

A further object of the instant invention is to provide a a watering nozzle which may be selectively adjusted to control the flow characteristics of the water emitting therefrom.

Other objects and advantages of the instant invention reside in the combinations of elements, arrangements of parts, and features of construction and operation, all as will be more fully pointed out hereinafter and disclosed in the accompanying drawings wherein there is shown a preferred embodiment of this inventive concept.

In the drawings:

FIGURE 5 is a top plan view similar to FIGURE 1;

FIGURE 6 is an enlarged transverse cross-sectional view of the irrigation pipe and supports of FIGURE 5 taken substantially along line 6—6 thereof as viewed in the direction indicated by the arrows;

FIGURE 7 is a top plan view of the pipe and support of FIGURE 6 as may be seen from along line 7—7 as viewed in the direction indicated by the arrows;

FIGURE 8 is an enlarged cross-sectional view of the nozzle of FIGURES 6 and 7, taken substantially along line 8—8 of FIGURE 7 as viewed in the direction indicated by the arrows; and FIGURE 9 is a front elevational view of the nozzle of FIGURE 8 illustrating the movable sleeve for controlling the lateral divergence of water emitting from the nozzle of the instant invention.

Figure 1:
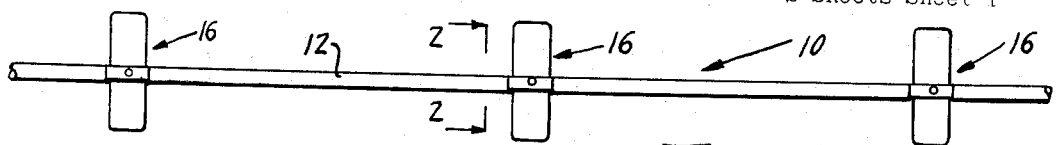
FIGURE 1 is a top plan view of an irrigation pipe supported from an underlying surface by a plurality of stands constructed in accordance with the instant invention.

Referring now to the drawings in detail, wherein like reference characters designate like elements throughout the several views thereof, there is shown generally at 10 an irrigation system comprised of a tubular pipe 12 supported from a ground surface 14 by a plurality of stands shown generally at 16. A plurality of nozzles shown generally at 18 are fixedly secured to a strengthening plate 20 on pipe 12 and communicate therethrough to distribute water in an area covered by irrigation system 10. Pipe 12 and strengthening plate 20 are made of similar materials which may be either metal or plastic. The connection between pipe 12 and plate 20 may be effected in any suitable manner, such as by gluing, soldering, brazing, welding or the like. As may be seen best in FIGURES 2 and 6, plate 20 is preferably concentric with pipe 12 and closely spaced thereto.

Each of stands 16 includes a pair of arcuate segments 22 describing a major portion of a circle, a downwardly extending first leg 24 integral with one side of segment 22, a downwardly extending second leg 26 and a pair of cross-bars 28, 30 securing first legs 24 and second legs 26 together. As may be seen best in FIGURES 3 and 4, arcuate segment 22, first leg 24 and second leg 26 reside in a common plane with these subassemblies being secured together by cross-braces 28, 30 to form stand 16. It will be apparent that cross-bars 28, 30 are the only portion of stand 16 resting on ground surface 14 thereby precluding injury to a large surface area, as will occur when pipe 12 is resting on the ground.

It should be noted that stand 16 is made of a spring wire material such that arms 24, 26 may be grasped and bent together to increase the radius of curvature of arcuate segments 22 thereby releasing stand 16 from about pipe 12. It will be noted that the connection between each of legs 24, 26 and arcuate segment 22 is a reverted fold 32 which is moved outwardly by the bending of the arms 24, 26 to allow the removal of pipe 12 from stand 16. It will accordingly be apparent that stands 16 may be readily removed for disassembling irrigation system 10 in order to move it from place to place. Similarly, the removal of stands 16 from pipe 12 allows the storage of the components of system 10 in a relatively small area.

Figure 3:
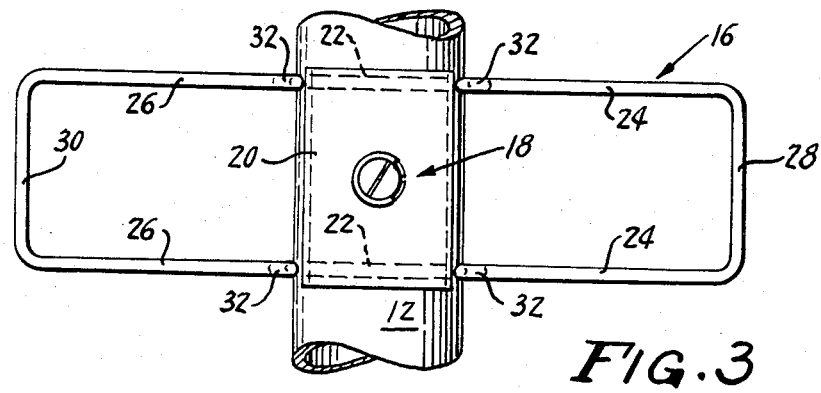
FIGURE 3 is an enlarged top plan view of the stand and pipe of FIGURE 2.
Figure 2:
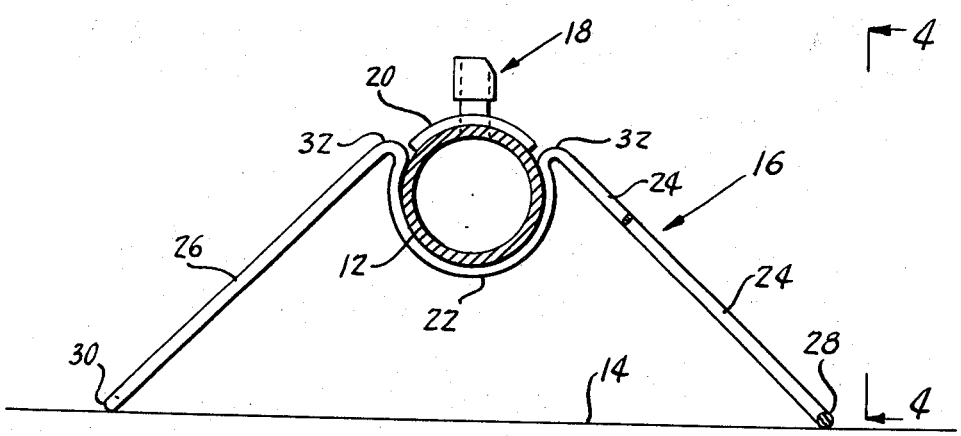
FIGURE 2 is an enlarged transverse cross-sectional view of the irrigation pipe and stand of FIGURE 1 taken substantially along line 2—2 thereof as viewed in the direction indicated by the arrows, certain parts being broken away for purposes of illustration.
Figure 4:
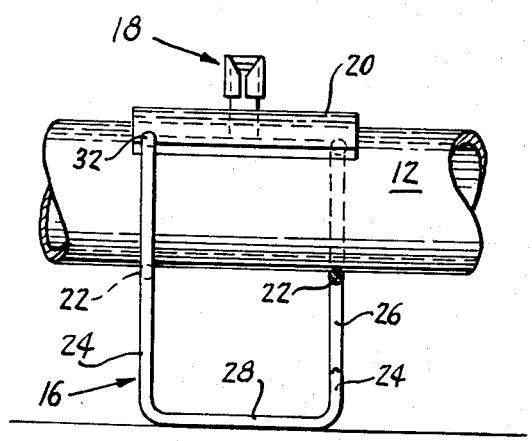
FIGURE 4 is a side elevational view of the stand and pipe of FIGURE 2 as may be seen from along line 4—4 thereof as viewed in the direction indicated by the arrows, certain parts being broken away for clarity of illustrations.

Referring now to FIGURES 2 through 4 inclusive, 6 and 7, it will be seen plate 20 is closely secured to the outer surface of pipe 12 and extends beyond the plane formed by each of arcuate segments 22. When the individual attaches stand 16 to pipe 12, strengthening plate 20 will coopearte with reverted fold 32 to position nozzle 18 in a substantially vertical attitude to promote uniformity of water distribution from each of nozzles 18.

As mentioned previously, legs 24, 26 may be bent together to increase the radius of curvature of segment 22 and move reverted folds 32 apart to receive or release pipe 12. Conversely, the weight of pipe 12 and the weight of the water therein will tend to separate legs 24, 26. This acts to decrease the radius of curvature of pipe 12 and thereby increase the gripping forces between pipe 12 and stand 16.

Referring now to FIGURES 8 and 9, plate 20 is illustrated as secured to pipe 22 by a layer 34 of adhesive material, such as epoxy resin or the like, covering an outlet aperture 36 in pipe 12. Plate 20 forms an internally threaded opening 38 substantially coaxial with outlet aperture 36 to receive the lower threaded portion 40 of a cylindrical base 42 of nozzle 18. Base 42 forms an internally threaded passageway 44 in fluid communication with the interior of pipe 12 through outlet opening 36 and receives an externally threaded screw shown generally at 46. Screw 46 provides a conduit 48 in communication with a transverse outlet 50 immediately below countersunk head 52. It will be seen that a pressurized liquid within pipe 12 will flow through aperture 36, passageway 44, conduit 48 and outlet 50 to water the area adjacent system 10.

The upper end of base 42 forms a frusto-conical recess 54 complementarily configured to the frusto-conical undersurface 56 of countersunk head 52. Head 52 forms the customary transverse screwdriver receiving slot 58 allowing an individual to rotate screw 46 to vary the opening formed between recess 54 and undersurface 56 of screwhead 52. By inserting screw 56 further into base 42, the gap between recess 54 and head 52 will be narrowed, thus projecting the flow of water a further distance from pipe 12. Conversely, the widening of the gap between recess 54 and head 52 will shorten the flow of water emitting from nozzle 18.

An important feature of the instant invention resides in the provision of a water directing sleeve shown generally at 60 slidably and rotatably mounted about the upper end of base 42. Although sleeve 60 may be made of a metallic material, such as brass or the like, it is preferably made of hard rubber or other slightly resilient material for purposes more fully explained hereinafter. Sleeve 60 includes a substantially cylindrical band 62 frictionally engaged about the upper end of base 42 and providing a V-shaped slot 64, the apex of which communicates with a rectangular slot 66. Since band 62 is preferably slightly resilient, sleeve 60 preferably has a nominal internal diameter slightly less than the external diameter of base 42. Since slots 64, 66 run throughout the longitudinal extent of band 62, sleeve 60 may be expanded slightly to fit over base 42 with the resilient characteristics of band 62 providing a secure connection therebetween.

It will accordingly be seen that sleeve 60 may be moved upwardly and downwardly to expose different portions of slots 64, 66 to the water transmitting gap formed between recess 54 and screwhead 52. It will therefore be seen that slots 64, 66 limit the lateral dispersion of water emitting from nozzle 18 to provide another degree of control over the coverage characteristics of system 10. It should be understood that sleeve 60 may be used with a nozzle having a 360° outlet characteristic rather than the 180° outlet characteristic of screw 46. Accordingly, the divergence of V-shaped slot 64 may range from a few degrees to an angle approaching 360°. It is preferred, however, that the divergence of V-shaped slot 64 lie between 5 and 50° to achieve a balance between the degree of control desired and the length of sleeve 60 which will be necessary in using a divergence angle of small magnitude.

Another reason for making sleeve 60 of a slightly resilient material is the provision of a seal between the outer periphery 68 of screwhead 52 and the interior surface of band 64. Since sleeve 60 is preferably of smaller diameter than base 42, it will tend to contract to its nominal size above the point of contact with outer periphery 68. This will provide a seal sufficient to overcome normal pressures involved in irrigation, thereby directing substantially all the water flow through slot 64, as may be seen in FIGURE 8.

It is now seen that there is herein provided an improved sprinkler nozzle and stand which accomplish all of the objects and advantages of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:
1. A combined nozzle and cover controller therefor comprising:
   a nozzle having a discharge aperture for distributing a liquid adjacent thereto, and a head disposed above said discharge aperture;
   a sleeve formed of a resilient material and slidably mounted on said nozzle, said sleeve having a V-shaped slot adjacent said discharge aperture for selectively limiting the lateral dispersion of the liquid emitting from the nozzle upon movement of the sleeve with respect to the nozzle;
      said sleeve having a smaller cross-sectional area than said head and being fitted thereover to provide a seal directing substantially all of the water flow through the slot.

2. The combination of claim 1 wherein said sleeve extends around the exterior of said nozzle less than the full periphery thereof.

3. A combined nozzle and cover controller therefor comprising:
   a nozzle having a discharge aperture for distributing a liquid adjacent thereto, said nozzle including a base having an internally threaded passageway for communication with a liquid carrying pipe;
   a water distributing screw including
      an externally threaded shank received in the passageway having a conduit for transmitting the liquid from the passageway and an outlet for transmitting the liquid from the conduit to the discharge aperture;
      said nozzle further including an enlarged head on the shank above said outlet, said head having an undersurface cooperating with the uppermost portion of the nozzle base to form the discharge aperture; and
   a sleeve slidably mounted on said nozzle, said sleeve having a V-shaped slot adjacent the discharge outlet for selectively limiting the lateral dispersion of the liquid emitting from the nozzle upon movement of the sleeve with respect to the nozzle.

4. The combination of claim 3 wherein the undersurface of the head is frusto-conical in shape, and the uppermost portion of the base forms a complementary frusto-conically shaped recess forming the discharge aperture into an upwardly directed water transmitting gap.

5. The combination of claim 4 wherein the sleeve is made of a resilient material of smaller cross-sectional area than the head, the sleeve being fitted over the head to provide a seal directing substantially all of the water flow through the slot.

6. A combined nozzle and cover controller therefor comprising a nozzle having a discharge aperture for distributing a liquid adjacent thereto:
   a sleeve, slidably mounted on said nozzle and having a V-shaped slot formed therein adjacent the discharge aperture for selectively limiting the lateral dispersion of the liquid emitting from the nozzle upon movement of the sleeve with respect to the nozzle;

said sleeve including a rectangular slot communicating with the apex of the V-shaped slot, and wherein the rectangular and V-shaped slots extend longitudinally throughout the length of the sleeve.

7. A combined nozzle and cover controller therefor comprising:

a nozzle having a discharge aperture for distributing a liquid adjacent thereto, and a head disposed above said discharge aperture;

a sleeve slidably mounted on said nozzle, said sleeve having a slot formed therein adjacent the discharge portion for selectively limiting the lateral dispersion of the liquid emitting from the nozzle upon movement of the sleeve with respect to said nozzle; and said sleeve having a smaller cross-sectional area than said head and being frictionally engaged with and fitted over said head to provide a seal directing substantially all of the water flow through said slot.

8. The combination of claim 7 wherein said sleeve extends around said nozzle for a distance less than the full periphery thereof.

9. The combination of claim 7 wherein said sleeve is formed of a resilient material.

10. The combination of claim 7 wherein said sleeve is V-shaped.

References Cited

UNITED STATES PATENTS

| | | | |
|---|---|---|---|
| 673,362 | 4/1901 | Hill | 239—458 |
| 699,801 | 5/1902 | Martin | 239—457 |
| 964,945 | 7/1910 | Vacher | 239—538 |
| 1,590,910 | 6/1926 | Rumrill | 239—280.5 X |
| 1,811,042 | 6/1931 | Desmond | 239—280 |
| 1,931,761 | 10/1933 | Hertel | 239—541 X |
| 2,003,837 | 4/1935 | Skoglund | 248—83 |
| 2,620,232 | 12/1952 | King. | |
| 3,021,102 | 2/1962 | Kuempel. | |

FOREIGN PATENTS 1,577   4/1927   Australia.

M. HENSON WOOD, JR., *Primary Examiner.*

VAN C. WILKS, *Assistant Examiner.*